United States Patent
Budraitis et al.

(10) Patent No.: US 12,514,946 B2
(45) Date of Patent: Jan. 6, 2026

(54) FRAGRANCE RELEASING DEVICE

(71) Applicant: Takasago International Corporation (USA), Rockleigh, NJ (US)

(72) Inventors: Anthony Budraitis, Farmingdale, NJ (US); Lucia Moreno, Closter, NJ (US)

(73) Assignee: Takasago International Corporation (USA), Rockleigh, NJ (US)

( * ) Notice: Subject to any disclaimer, the term of this patent is extended or adjusted under 35 U.S.C. 154(b) by 1001 days.

(21) Appl. No.: 17/525,109

(22) Filed: Nov. 12, 2021

(65) Prior Publication Data

US 2022/0152261 A1    May 19, 2022

Related U.S. Application Data

(60) Provisional application No. 63/114,828, filed on Nov. 17, 2020.

(51) Int. Cl.
*A61L 9/12* (2006.01)
*A01M 1/20* (2006.01)
(Continued)

(52) U.S. Cl.
CPC .......... *A61L 9/012* (2013.01); *A01M 1/2027* (2013.01); *A01M 29/12* (2013.01); *A61L 9/12* (2013.01); *A61L 2209/131* (2013.01)

(58) Field of Classification Search
CPC . A61L 9/012; A61L 9/12; A61L 9/125; A61L 2209/131; A61L 9/04; A61L 9/127;
(Continued)

(56) References Cited

U.S. PATENT DOCUMENTS

| 4,145,001 A | 3/1979 | Weyenberg et al. |
| 4,283,011 A | 8/1981 | Spector |

(Continued)

FOREIGN PATENT DOCUMENTS

| DE | 298 09 384 U1 | 12/1998 |
| EP | 0 081 791 A1 | 6/1983 |

(Continued)

OTHER PUBLICATIONS

U.S. Appl. No. 13/943,515 (U.S. Pat. No. 9,757,490), filed Jul. 16, 2013 (Sep. 12, 2017).

(Continued)

*Primary Examiner* — Christopher R Dandridge
*Assistant Examiner* — Juan C Barrera
(74) *Attorney, Agent, or Firm* — Baker Botts L.L.P.

(57) ABSTRACT

Fragrance delivery device with first flexible impermeable barrier layer and second flexible impermeable barrier layer coupled to the first flexible impermeable barrier layer to define a first chamber. A reservoir substance having a volatile medium is disposed in the first chamber. The device further includes at least one vapor releasing microporous layer having a plurality of micropores therein. The vapor releasing microporous layer defines a second chamber. A frangible seal seals the first chamber from the second chamber in a delivery condition. Activation of the device compromises the frangible seal to fluidly couple the first chamber with the second chamber and to transfer the reservoir substance to the second chamber. The volatile medium of the reservoir substance is releasable from the fragrance delivery device via the plurality of micropores in the use condition.

20 Claims, 9 Drawing Sheets

(51) Int. Cl.
*A01M 29/12* (2011.01)
*A61L 9/012* (2006.01)

(58) Field of Classification Search
CPC .. A01M 1/2055; A01M 29/12; A01M 1/2044; B65D 75/5855; B65D 1/30; B65D 81/3277; B65D 81/3294; B65D 81/3484; B65D 83/771
USPC ........ 239/6, 34, 44, 47, 51.5, 53, 55, 56, 57
See application file for complete search history.

(56) References Cited

U.S. PATENT DOCUMENTS

| | | | |
|---|---|---|---|
| 4,890,872 A | 1/1990 | Parrotta et al. | |
| 5,115,975 A | 5/1992 | Shilling | |
| 5,152,742 A | 10/1992 | Simpson | |
| 5,324,490 A | 6/1994 | Van Vlahakis et al. | |
| 5,358,502 A | 10/1994 | Herbig et al. | |
| 5,679,334 A | 10/1997 | Semoff et al. | |
| 5,782,409 A * | 7/1998 | Paul | A61L 9/12 428/905 |
| 5,788,155 A | 8/1998 | Martin et al. | |
| 5,798,385 A | 8/1998 | Marin | |
| 5,840,338 A | 11/1998 | Roos et al. | |
| 6,270,841 B1 | 8/2001 | Mikhael et al. | |
| 6,544,302 B2 | 4/2003 | Berger et al. | |
| 6,547,468 B2 * | 4/2003 | Gruenbacher | A47K 7/03 401/133 |
| 6,691,872 B1 | 2/2004 | Berman et al. | |
| 6,705,541 B2 | 3/2004 | Schuehrer et al. | |
| 6,902,817 B2 | 6/2005 | Bowen et al. | |
| 7,005,161 B2 | 2/2006 | Mikhael et al. | |
| 7,926,735 B1 | 4/2011 | Mobley | |
| 8,696,982 B2 | 4/2014 | Gruenbacher et al. | |
| 8,709,337 B2 | 4/2014 | Gruenbacher et al. | |
| 8,740,110 B2 | 6/2014 | Gruenbacher et al. | |
| 8,931,711 B2 | 1/2015 | Gruenbacher et al. | |
| 9,272,063 B2 | 3/2016 | Gruenbacher et al. | |
| 9,439,993 B2 | 9/2016 | Gruenbacher et al. | |
| 9,468,697 B2 | 10/2016 | Gruenbacher et al. | |
| 9,993,574 B2 | 6/2018 | Gruenbacher et al. | |
| 10,143,766 B2 | 12/2018 | Gruenbacher et al. | |
| 2003/0089791 A1 | 5/2003 | Chen et al. | |
| 2003/0097936 A1 | 5/2003 | Maleeny et al. | |
| 2003/0168521 A1 | 9/2003 | Skalitzky et al. | |
| 2004/0188535 A1 | 9/2004 | Hart et al. | |
| 2005/0147523 A1 | 7/2005 | Laudamiel-Pellet et al. | |
| 2005/0148479 A1 | 7/2005 | Barthel et al. | |
| 2005/0199742 A1 | 9/2005 | Maat | |
| 2009/0130047 A1 | 5/2009 | Weiss et al. | |
| 2009/0302128 A1 | 12/2009 | Zobele | |
| 2011/0243628 A1 | 10/2011 | MacLean et al. | |
| 2012/0181349 A1 | 7/2012 | Adleff et al. | |
| 2013/0022876 A1 | 1/2013 | Stokes et al. | |
| 2014/0048614 A1 | 2/2014 | Santini et al. | |
| 2014/0209700 A1 | 7/2014 | Olchovy et al. | |
| 2015/0329692 A1 | 11/2015 | Stokes et al. | |
| 2016/0286782 A1 | 10/2016 | Manhas et al. | |
| 2016/0354505 A1 | 12/2016 | Gruenbacher et al. | |
| 2018/0256767 A1 | 9/2018 | Gruenbacher et al. | |
| 2019/0030201 A1 | 1/2019 | Gruenbacher et al. | |
| 2020/0306404 A1 | 10/2020 | Seshadri et al. | |

FOREIGN PATENT DOCUMENTS

| | | |
|---|---|---|
| EP | 0 836 857 A1 | 4/1998 |
| WO | WO 02/32472 A1 | 4/2002 |
| WO | WO 2007/110086 A1 | 10/2007 |
| WO | WO 2009/105232 A1 | 8/2009 |
| WO | WO 2010/120961 A2 | 10/2010 |
| WO | WO 2010/121039 A2 | 10/2010 |
| WO | WO 2011/067709 A1 | 6/2011 |
| WO | WO 2012/044659 A1 | 4/2012 |
| WO | WO 2013/041384 A1 | 3/2013 |
| WO | WO 2014/014920 A2 | 1/2014 |
| WO | WO 2014/116470 A1 | 7/2014 |
| WO | WO 2014/116909 A2 | 7/2014 |
| WO | WO 2017/070344 A2 | 4/2017 |
| WO | WO 2018/208866 A1 | 11/2018 |

OTHER PUBLICATIONS

U.S. Appl. No. 15/677,716 (U.S. Pat. No. 10,814,029), filed Aug. 15, 2017 (Oct. 27, 2020).
U.S. Appl. No. 15/769,100 (Abandoned), filed Apr. 18, 2018.
U.S. Appl. No. 16/610,618 (US 2020/0069832), filed Nov. 4, 2019 (Mar. 5, 2020).
U.S. Appl. No. 16/610,618, Feb. 28, 2022 Restriction Requirement.
U.S. Appl. No. 15/769,100, Mar. 25, 2021 Notice of Abandonment.
U.S. Appl. No. 15/769,100, Aug. 4, 2020 Non-Final Office Action.
U.S. Appl. No. 15/677,716, Sep. 17, 2020 Issue Fee Payment.
U.S. Appl. No. 15/677,716, Aug. 5, 2020 Notice of Allowance.
U.S. Appl. No. 15/677,716, Jun. 29, 2020 Amendment and Request for Continued Examination (RCE).
U.S. Appl. No. 15/677,716, Jun. 22, 2020 Applicant Initiated Interview Summary.
U.S. Appl. No. 15/677,716, Jun. 5, 2020 Advisory Action.
U.S. Appl. No. 15/677,716, May 19, 2020 Response after Final Action.
U.S. Appl. No. 15/677,716, Mar. 30, 2020 Final Office Action.
U.S. Appl. No. 15/677,716, Dec. 6, 2019 Response to Non-Final Office Action.
U.S. Appl. No. 15/677,716, Sep. 6, 2019 Non-Final Office Action.
U.S. Appl. No. 13/943,515, Aug. 3, 2017 Issue Fee Payment.
U.S. Appl. No. 13/943,515, May 3, 2017 Notice of Allowance.
U.S. Appl. No. 13/943,515, Jan. 17, 2017 Response after Final Action.
U.S. Appl. No. 13/943,515, Jan. 9, 2017 Applicant Initiated Interview Summary.
U.S. Appl. No. 13/943,515, Dec. 1, 2016 Final Office Action.
U.S. Appl. No. 13/943,515, Sep. 28, 2016 Response to Non-Final Office Action.
U.S. Appl. No. 13/943,515, Jun. 29, 2016 Non-Final Office Action.
U.S. Appl. No. 13/943,515, Nov. 20, 2015 Request for Continued Examination (RCE).
U.S. Appl. No. 13/943,515, Nov. 2, 2015 Advisory Action.
U.S. Appl. No. 13/943,515, Oct. 21, 2015 Amendment and Request for Continued Examination (RCE).
U.S. Appl. No. 13/943,515, Jul. 22, 2015 Final Office Action.
U.S. Appl. No. 13/943,515, May 21, 2015 Response to Non-Final Office Action.
U.S. Appl. No. 13/943,515, Feb. 26, 2015 Non-Final Office Action.
U.S. Appl. No. 16/610,618, May 12, 2022 Non-Final Office Action.
U.S. Appl. No. 16/610,618, Apr. 27, 2022 Response to Restriction Requirement.
U.S. Appl. No. 13/943,515, Mar. 3, 2017 Notice of Allowance.
Partial European Search Report for EP Application No. EP 13176740.2, dated Nov. 12, 2013.
International Search Report mailed Jan. 10, 2014 in International Application No. PCT/US2013/050695.
International Search Report mailed May 11, 2017 in International Application No. PCT/US2016/057910.
International Search Report mailed Aug. 6, 2018 in International Application No. PCT/US2018/031707.

* cited by examiner

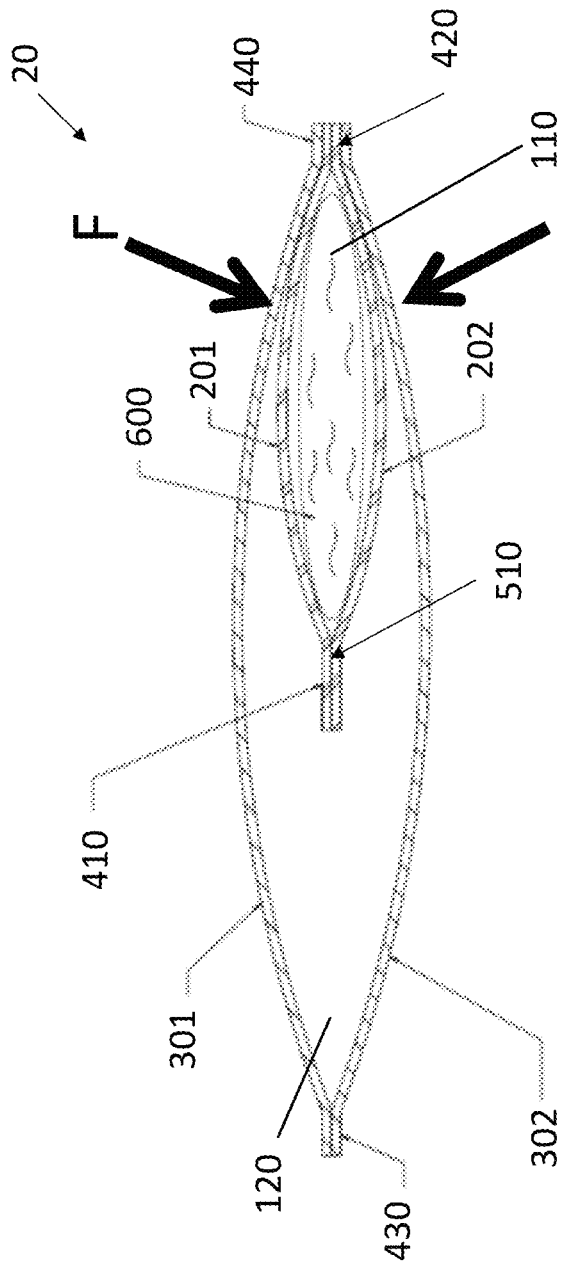

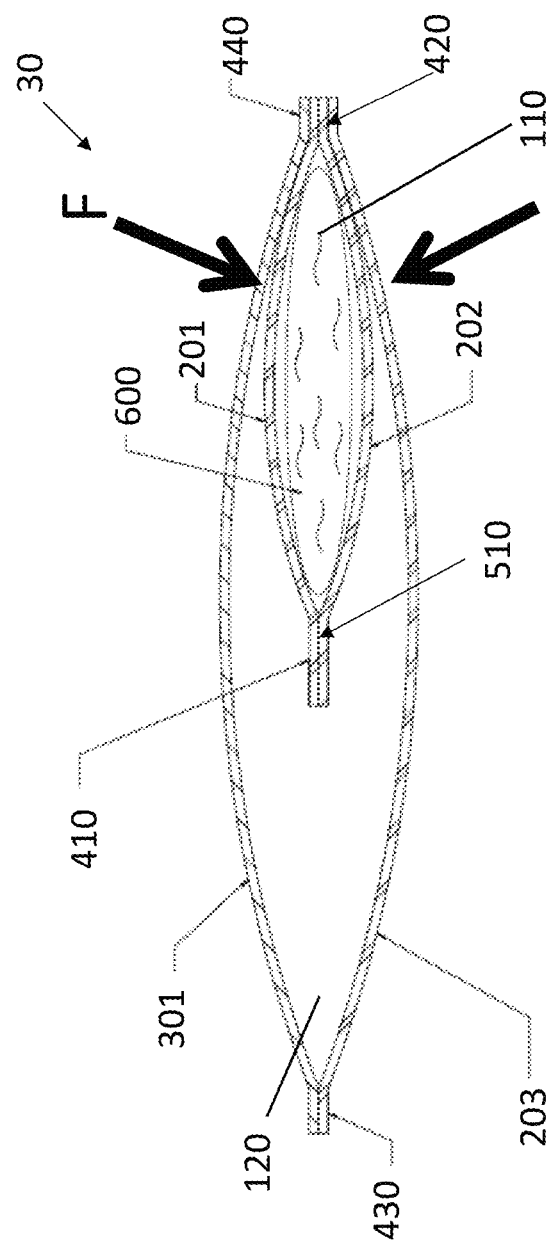

FRAGRANCE RELEASING DEVICE

CROSS-REFERENCE TO RELATED APPLICATION

This application claims the benefit of and claims priority to U.S. Provisional Application Ser. No. 63/114,828 filed on Nov. 17, 2020, which is incorporated herein by reference in its entirety and for all purposes.

FIELD OF THE DISCLOSED SUBJECT MATTER

The disclosed subject matter relates to a fragrance releasing device having a microporous membrane that is ready-to-use without requiring further energizing of the medium therein.

BACKGROUND OF THE DISCLOSED SUBJECT MATTER

A variety of air freshening devices exist in the marketplace offering consumers an array of performance options. Such air freshening devices include energy-driven units, absorbent pad devices, and traditional membrane devices. Energy driven or power-assisted units, whether they are based on the use of heat, a fan, or both to assist in fragrance dispersion, have been proposed. The energy assisted fragrance dispersion can contribute to a greater fragrance awareness. However, such units require plugging them into the wall or batteries and can increase costs that makes these units expensive to manufacture and operate. These devices are also often difficult to transport and cumbersome for on-the-go users.

A traditional fragrance carrier is described in U.S. Pat. No. 7,926,735 to Mobley et al. In Mobley, the carrier substrate is a paperboard card, which is impregnated with a fragrance solution for diffusion. However, when fragrance is absorbed directly onto a carrier such as paperboard or paper-like materials, the fragrance release is inordinately high when the carrier is newly exposed and subsequently drops dramatically as time passes. Such carriers require additional housing material to surround the carrier so that the fragrance does not transfer onto a user's hands or personal effects or otherwise during shipping. Such carriers can also overpower a small space, such as a locker, and can create an unpleasant experience. Furthermore, such carriers are limited in the kinds of fragrances that can be used.

Traditional membrane devices have become appreciated for their compact construction and controlled release. Typically, such devices are constructed with a foil sealed, single or copolymer, membrane covering the full expanse of a shallow tray, which contains the fluid contents to be dispensed. Such devices, however, are very limited in the kinds of fragrances that can be used as only certain vapor pressured fragrances can emanate from such devices. The option exists to use a microporous membrane to address said limitations. Devices constructed with microporous membranes, however, are often difficult to seal prior to activation and the fragrance mediums therein can seep through the pores to cause unpleasant conditions.

Additionally, devices using traditional membranes must utilize one or more carriers, diluents or surfactants in combination with fragrance medium to help drive and carry mediums, such as fragrance compositions containing heavier note fragrances, like some woody fragrances. Those carriers, diluents, or surfactants act as a thinner or thinning agent for heavier note fragrances and require a certain volume percentage of the fragrance components to enable devices with traditional membranes to perform, as desired. Unfortunately, the volume dedicated to these additional ingredients for devices using traditional membranes can replace volume that would otherwise be available for the fragrance itself, causing a lower percentage of fragrance to be used, which is undesirable.

In contrast, with the embodiments of the disclosed subject matter, carriers, diluents, and surfactants are not required to deliver the fragrance or fragrance compositions using devices in accordance with the disclosed subject matter. Thus, the reservoir substance composition according to the disclosed subject matter can contain a higher percentage of fragrance not otherwise available in traditional device, and the intensity of such fragrances can be increased as compared to such traditional devices.

Therefore, there remains a need to provide a fragrance-releasing device, which provides the benefits of the above-mentioned devices, while improving upon at least the deficiencies. More particularly, it is desirable to have a fragrance-releasing device that can be more safely used near children and pets, provides for more efficient clean-up after use, enables utilization of a broad range of fragrance types, provide reduced seepage or leakage of the fragrance medium, is cost effective and easily transportable, and can provide an optimal fragrance experience over the course of its use. The present disclosure addresses these and other needs in further detail below.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

The present disclosure relates to fragrance releasing devices and systems having a vapor-releasing microporous layer and reservoir substance and methods of using such devices. The fragrance releasing devices, systems, and methods disclosed herein advantageously provide an optimal fragrance experience while avoiding negative drawbacks associated with traditional devices.

The present disclosure also provides for the fabrication of different sized devices. Such devices can be smaller or larger in size.

In addition, the use of a fully-sealed and self-contained device as presently disclosed also permits the device to be used more globally in locations without the need of a warming or energizing unit. The device can be oriented in any configuration, such as adhered to the back of a locker, and is not limited to a horizontal orientation often required by conventional devices.

To achieve these and other advantages and in accordance with the purpose of the disclosed subject matter, as embodied and broadly described, the disclosed subject matter includes a fragrance delivery device comprising a first flexible impermeable barrier layer and a second flexible impermeable barrier layer coupled to the first flexible impermeable barrier layer. The first and second flexible impermeable barrier layers define a first chamber. A reservoir substance having a volatile medium is disposed in the first chamber. The device further includes a first vapor releasing microporous layer having a plurality of micropores therein and a second vapor releasing microporous layer having a plurality of micropores therein. The first and second vapor releasing microporous layers define a second chamber. The device further includes a frangible seal to seal the first chamber from the second chamber in a delivery condition. Activation of the fragrance delivery device in a use condition compromises the frangible seal to fluidly couple the first chamber with the second chamber and to transfer the reservoir substance to the second chamber. The volatile medium of the reservoir substance is releasable from the fragrance delivery device via the plurality of micropores in the use condition.

In accordance with another aspect of the disclosed subject matter, a fragrance delivery device is provided comprising a first flexible impermeable barrier layer and a second flexible impermeable barrier layer coupled to the first flexible impermeable barrier layer. The first and second impermeable barrier layers define a first chamber. A reservoir substance having a volatile medium is disposed in the first chamber. The device further includes a vapor releasing microporous layer having a plurality of micropores therein and a second chamber is defined by the vapor releasing microporous layer and at least one of the first and second flexible impermeable barrier layer. The device further includes a frangible seal to seal the first chamber from the second chamber in a delivery condition. Activation of the fragrance delivery device in a use condition compromises the frangible seal to fluidly couple the first chamber with the second chamber and to transfer the reservoir substance to the second chamber. The volatile medium of the reservoir substance is releasable from the fragrance delivery device via the plurality of micropores in the use condition.

In accordance with another aspect of the disclosed subject matter, a fragrance delivery device is provided comprising a first flexible impermeable barrier layer and a second flexible impermeable barrier layer coupled to the first flexible impermeable barrier layer. The first and second impermeable barrier layers define a first chamber. A reservoir substance having a volatile medium is disposed in the first chamber. The device further includes a vapor releasing microporous layer having a plurality of micropores therein and a second chamber is defined by the vapor releasing microporous layer and a third flexible impermeable barrier layer. The device further includes a frangible seal to seal the first chamber from the second chamber in a delivery condition. Activation of the fragrance delivery device in a use condition compromises the frangible seal to fluidly couple the first chamber with the second chamber and to transfer the reservoir substance to the second chamber. The volatile medium of the reservoir substance is releasable from the fragrance delivery device via the plurality of micropores in the use condition.

In accordance with another aspect of the disclosed subject matter, a method of using a fragrance delivery device is provided. The method includes providing a fragrance delivery device in accordance with the disclosed subject matter. The method further includes activating the fragrance delivery device from the delivery condition to the in-use condition. Activating the device includes exerting a predetermined pressure to the fragrance delivery device to compromise the frangible seal to fluidly couple the first chamber with the second chamber and to transfer the reservoir substance to the second chamber. The system further includes releasing the volatile medium of the reservoir substance from the fragrance delivery device via the plurality of micropores.

The disclosed subject matter also includes a method of making a fragrance delivery device having some or all of the features described herein. As recognized in the art, the fragrance devices and fragrance delivery systems disclosed herein can include some or all of the features described herein, or any suitable combination thereof.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which:

FIG. 2 depicts a cross-sectional perspective view of a device in accordance with another embodiment of the disclosed subject matter in a delivery condition.

FIG. 3 depicts a cross-sectional perspective view of a device in accordance with another embodiment of the disclosed subject matter in a delivery condition.

DETAILED DESCRIPTION

Definitions

Figure 1A:
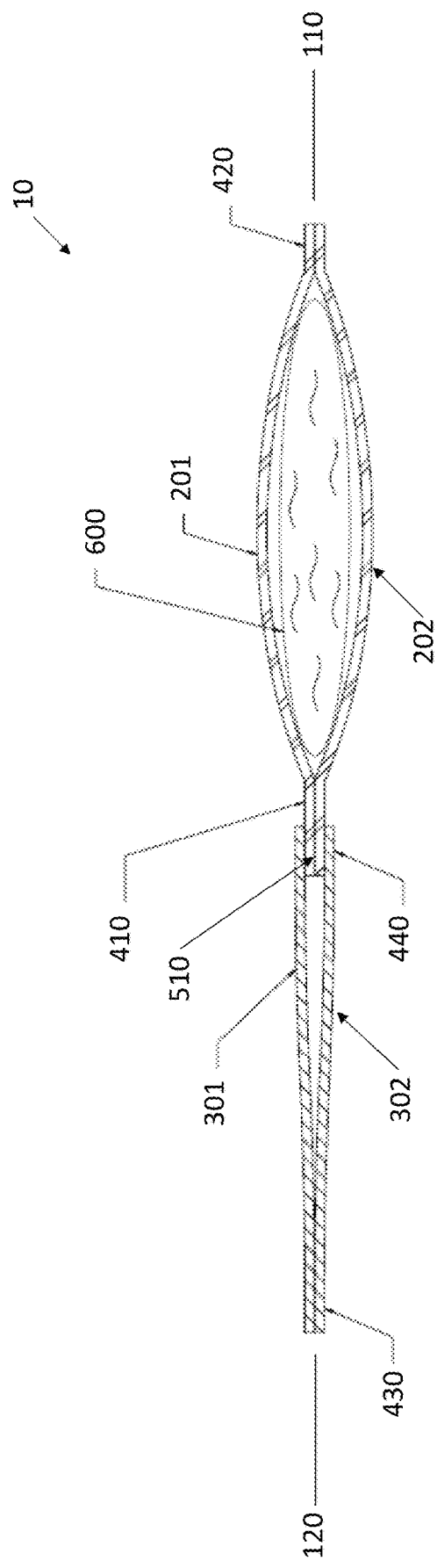
FIG. 1A depicts a cross-sectional perspective view of a device in accordance with an embodiment of the disclosed subject matter in a delivery condition.

The terms used in this specification generally have their ordinary meanings in the art, within the context of this disclosure and in the specific context where each term is used. Certain terms are discussed below, or elsewhere in the specification, to provide additional guidance to a person of ordinary skill in the art describing the compositions and methods of the disclosure and how to make and use them.

As used herein, the use of the word "a" or "an" when used in conjunction with the term "comprising" in the claims and/or the specification may mean "one," but it is also consistent with the meaning of "one or more," "at least one," a plurality, and "one or more than one." Still further, the terms "having," "including," "containing" and "comprising"

are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, the term "microporous" means average pore sizes not exceeding about 1 μm or micrometer. As such, a microporous membrane means a membrane having pores with an average pore size that does not exceed about 1 μm.

As used herein, the "volatile active medium" or "volatile medium" refers to a volatile fragrance compound, fragrance composition containing one or more volatile fragrance compounds, a medicant, decongestant, insect repellant, insecticide, aroma therapeutic composition, or any other vapor having therapeutic or beneficial qualities.

Fragrance Delivery Device

Reference will now be made in detail to embodiments of the disclosed subject matter, examples of which are illustrated in the accompanying drawings. The disclosed subject matter will be described in conjunction with the detailed description of the system.

As described herein, the devices presented herein are intended for releasing volatile medium, such as a fragrance or fragrance composition, into the surrounding environment.

In accordance with the disclosed subject matter, the fragrance delivery device generally includes a first flexible impermeable barrier layer and a second flexible impermeable barrier layer coupled to the first flexible impermeable barrier layer, the first and second impermeable barrier layers defining a first chamber. A reservoir substance having a volatile medium is disposed in the first chamber. The device further includes a first vapor releasing microporous layer having a plurality of micropores therein and a second vapor releasing microporous layer having a plurality of micropores therein. The first and second vapor releasing microporous layers define a second chamber. The device further includes a frangible seal to seal the first chamber from the second chamber in a delivery condition. Activation of the fragrance delivery device in a use-condition compromises the frangible seal to fluidly couple the first chamber with the second chamber and to transfer the reservoir substance to the second chamber. The volatile medium of the reservoir substance is releasable from the fragrance delivery device via the plurality of micropores in the use-condition.

As embodied herein, the devices pictured in FIGS. 1A-8 have a generally round shape or shapes, and convex structure. However, fragrance delivery devices in accordance with the disclosed subject matter can be made in a variety of geometric shapes in plan view (i.e., square, octagonal, triangular, polygonal, star, letter shape, character shape, asymmetrical shape etc.), for example, to correspond with a specific surface area for desired release rate of the volatile active medium, without departing from the scope of the disclosed subject matter. The device can furthermore have a variety of shapes when viewed in a side view, including but not limited to substantially planar orientation or bulbous, pillow shaped.

Figure 1B:
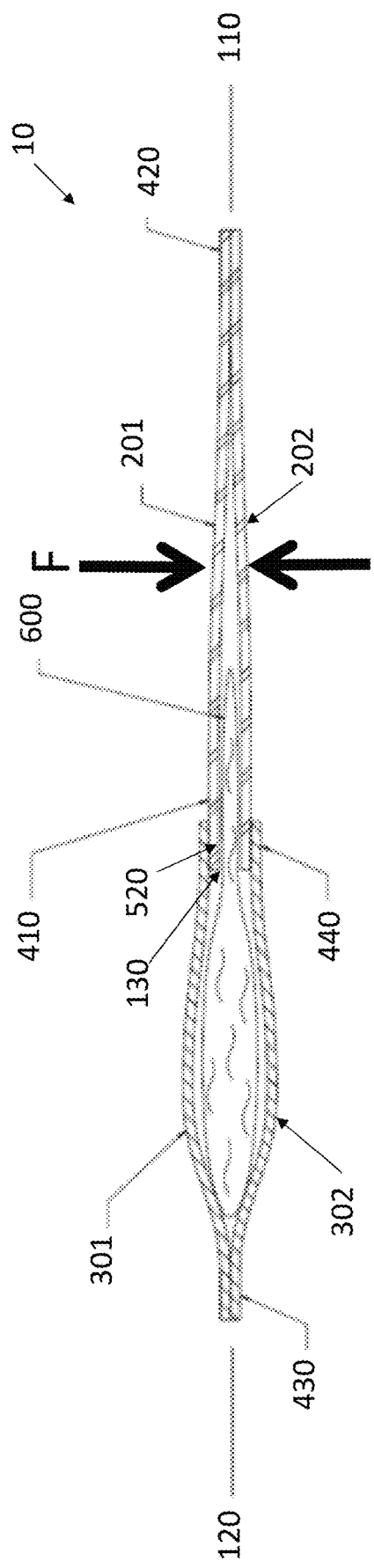
FIG. 1B depicts a cross-sectional perspective view of the device of FIG. 1A in a use condition.

For the purpose of explanation and illustration, and not limitation, an exemplary embodiment of a fragrance delivery device (10) in accordance with the disclosed subject matter is shown in FIG. 1A and FIG. 1B. The device (10) includes a first flexible impermeable barrier layer (201) coupled to a second flexible impermeable barrier layer (202) to define a first chamber (110). The first chamber can have any suitable perimeter shape, such as for purposes of example but not limitation, at least a circular, rectangular, square, polygonal, star, letter shape, character shape, and asymmetrical shape, in plan view. The first chamber can have a first edge (410) and a second edge (420) along the perimeter of the sealed chamber, as depicted by the cross-sectional view of FIG. 1A. The first edge (410) and the second edge (420) can be positioned along a seam defined by the first flexible impermeable barrier layer (201) and the second flexible impermeable barrier layer (202). The first flexible impermeable barrier layer (201) can be coupled to the second flexible impermeable barrier layer (202) using any suitable means. For purpose of example, and as embodied herein, the first flexible impermeable barrier layer (201) can be heat sealed to the second flexible impermeable barrier layer (202) around the outer perimeters thereof. Alternatively, the first and second flexible impermeable barriers can be made of the same material in any of the embodiments herein. The first chamber (110) contains a reservoir substance (600) disposed therein having a volatile medium, as described further herein. The first chamber (110) can define a predetermined volume, and the reservoir substance (600) can have a volume equal or less than the predetermined volume of the first chamber (110).

The device (10) also includes a first vapor releasing microporous layer (301) having a plurality of micropores therein and second vapor releasing microporous layer (302) having a plurality of micropores therein. Alternatively, the first and second vapor releasing microporous layers can be made of the same material in any of the embodiments herein. For purposes of example and with reference to FIG. 1A, the configuration of the microporous layers is described further herein. The first and second vapor releasing microporous layers define a second chamber (120). The device and/or the second chamber can have any suitable shape, such as for purposes of example but not limitation, at least a circular, rectangular, square, polygonal, star, letter shape, character shape, and asymmetrical shape, in plan view. The first and second chambers can have different shapes or they can be the same. The second chamber (120) can have a first edge (430) and a second edge (440 along the perimeter of the sealed chamber, as depicted by the cross-sectional view of FIG. 1A. The first edge (430) and the second edge (440) can be positioned along a seam defined by the first vapor releasing microporous layer (301) and the second vapor releasing microporous layer (302) or any intermediate layers therebetween. For purpose of example, and as embodied herein, the first chamber (110) can be adjacent to the second chamber (120). Alternatively, and as described further herein, the first chamber can be disposed within the second chamber. The second chamber (120) is shown with the first and second microporous layers (301, 302) separated by a distance for purposes of illustration, but such layers (301, 302) can be flattened against each other in a delivery condition for a substantially planar device in a side view.

The device (10) further includes a frangible seal (510) to seal the first chamber (110) from the second chamber (120)

in a delivery condition. The flexible impermeable barrier layers (201) and (202) can inhibit the volatile medium from emitting through the plurality of micropores of the second chamber (120) when the device is in the delivery condition. With reference to FIG. 1A, the device (10) is depicted in the delivery condition, with the frangible seal (510) intact and sealing the first chamber (110) from the second chamber (120). The frangible seal (510) can be any appropriate frangible seal. For purpose of example, and as embodied herein, the frangible seal (510) can be a region of the heat seal coupling the first (201) and second (202) flexible impermeable barrier layers together that is configured to be compromised or ruptured when subjected to a predetermined pressure. Additionally or alternatively, at least one of the first (201) and second (202) flexible impermeable barrier layers can include score lines in a region of the coupling between the two layers, and the score lines can define at least a portion of the frangible seal (510). For example, at least one of the first (201) and second (202) flexible impermeable barrier layers can be configured to separate or tear at the score lines when subjected to a predetermined pressure.

For purpose of example, and as embodied herein, the second chamber (120) can be coupled to the first chamber (110) at the frangible seal (510). For example, the frangible seal (510) can be disposed at the first edge (410) of the first chamber and the second edge (440) of the second chamber. The second chamber can be coupled to the first chamber using any suitable coupling. For purpose of example, and as embodied herein, a portion of the outer perimeter of each of the first and second vapor releasing microporous layers (301, 302) can overlap with a portion of the respective first and second flexible impermeable barrier layers, (201, 202), and be heat sealed thereto.

As described further herein, the frangible seal (510) can be configured such that a force of a predetermined amount exerted on the first chamber transfers the fragrance delivery device from the delivery condition to the use-condition. The frangible seal may be achieved through any method of sealing that is rupturable when subjected to a predetermined pressure.

In FIG. 1B, the device (10) is pictured in a use condition after having been activated upon a predetermined force F imparted on the first chamber (110). Activation of the device (10) compromises the frangible seal (510) and fluidly couples the first chamber (110) with the second chamber (120). For purpose of example, and as embodied herein, application of a predetermined force F can increase pressure within the first chamber (110) when the first chamber is sealed from the second chamber (120) in the delivery condition. The increase in pressure within the first chamber (110) can compromise the frangible seal (510). For purpose of example, and as embodied herein, the frangible seal (510) can be a weakened region of a heat seal formed between the first flexible impermeable barrier layer (201) and the second flexible impermeable barrier layer (202). Upon application of the predetermined force F, the weakened region of the heat seal defining the frangible seal (510) can fail, or be compromised, and the first flexible impermeable barrier layer (201) can separate from the second flexible impermeable barrier layer (202) at the region of the frangible seal (510). Compromising the frangible seal (510) creates an opening (130) in the first chamber (110) and places the first chamber (110) in fluid communication with the second chamber (120).

With the first and second chambers in fluid communication, the reservoir substance (600) is transferred from the first chamber (110) to the second chamber (120). For example, the increase in pressure within the first chamber (110) caused by application of the predetermined force F to the first chamber (110) can cause the reservoir substance (600) to flow out of the first chamber (110) into the second chamber (120) through the opening (130) formed in the first chamber (110) by the compromised frangible seal (520). The volatile medium of the reservoir substance (600) is releasable from the fragrance delivery device (10) via the plurality of micropores of the second chamber (120) in the use-condition. As described further herein, the reservoir substance (600) and vapor releasing microporous layers (301, 302) can be configured to allow release of the volatile medium through the plurality of micropores, while preventing seepage of the reservoir substance through the vapor releasing microporous layers (301, 302).

FIG. 2 depicts a cross-sectional view of another embodiment of a fragrance delivery device (20) in accordance with the disclosed subject matter. The device (20) includes a first flexible impermeable barrier layer (201) coupled to a second flexible impermeable barrier layer (202) to define a first chamber (110). The first chamber can have a first edge (410) and a second edge (420). The first chamber (110) contains a reservoir substance (600) disposed therein having a volatile medium. The device (20) also includes a first vapor releasing microporous layer (301) having a plurality of micropores therein and second vapor releasing microporous layer (302) having a plurality of micropores therein. The first and second vapor releasing microporous layers define a second chamber (120). The second chamber (120) can have a first edge (430) and a second edge (440). The second chamber (120) is shown with the first and second microporous layers (301, 302) separated by a distance for purposes of illustration, but such layers (301, 302) can be flattened against each other in a delivery condition for a substantially planar device in a side view.

The device (20) further includes a frangible seal (510) to seal the first chamber (110) from the second chamber (120) in a delivery condition, as depicted in FIG. 2. Activation of the fragrance delivery device (20) in a use-condition compromises the frangible seal (510) to fluidly couple the first chamber (110) with the second chamber (120) and to transfer the reservoir substance (600) to the second chamber (120). The volatile medium of the reservoir substance (600) is releasable from the fragrance delivery device via the plurality of micropores in the use-condition.

As embodied herein, the first chamber (110) can be disposed within the second chamber (120). For example, the second edge (420) of the first chamber (110) can be coupled with the second edge (440) of the second chamber (120) such that the first chamber (110) is disposed within the second chamber (120). The first and second chambers can be coupled using any suitable coupling, as described above. As embodied herein, the frangible seal (510) can be located at the first edge (410) of the first chamber (110). Alternatively, the frangible seal (510) can comprise scoring lines or the like along a surface of the first chamber to facilitate a frangible portion of the first chamber.

As described above, the device (20) can be activated by application of a predetermined force F. With reference to FIG. 2, the predetermined force F can be applied to the second chamber (120) when the first chamber (110) is disposed within the second chamber (120). The predetermined force F can be transferred from the second chamber (120) to the first chamber (110) to increase pressure in the first chamber (110) and compromise the frangible seal (510), as described above.

FIG. 3 depicts a cross-sectional view of another embodiment of a fragrance delivery device (30) in accordance with another aspect of the disclosed subject matter. The device (30) includes a first flexible impermeable barrier layer (201) coupled to a second flexible impermeable barrier layer (202) to define a first chamber (110). The first chamber (110) can have a first edge (410) and a second edge (420). The first chamber (110) contains a reservoir substance (600) disposed therein having a volatile medium. The device (30) also includes a first vapor releasing microporous layer (301) having a plurality of micropores therein, and a second chamber (120) defined by the vapor releasing microporous layer (301) and a third flexible impermeable barrier layer (203). The second chamber (120) has a first edge (430) and a second edge (440). The device (30) further includes a frangible seal (510) to seal the first chamber (110) from the second chamber (120) in a delivery condition, as depicted in FIG. 3. Alternatively, the frangible seal (510) can comprise scoring lines or the like along a surface of the first chamber to facilitate a frangible portion of the first chamber. Activation of the fragrance delivery device (30) in a use-condition by a predetermined force F compromises the frangible seal (510) to fluidly couple the first chamber (110) with the second chamber (120) and to transfer the reservoir substance (600) to the second chamber (120). The volatile medium of the reservoir substance (600) is releasable from the fragrance delivery device via the plurality of micropores in the use-condition.

As embodied herein, the second edge (420) of the first chamber (110) can be coupled with the second edge (440) of the second chamber (120) such that the first chamber (110) is disposed within the second chamber (120). The first and second chambers can be coupled using any suitable coupling, as described above. Alternatively, and as described with respect to the embodiment of FIG. 4, the first chamber (110) of the device (40) can be adjacent to the second chamber (120).

Figure 4:
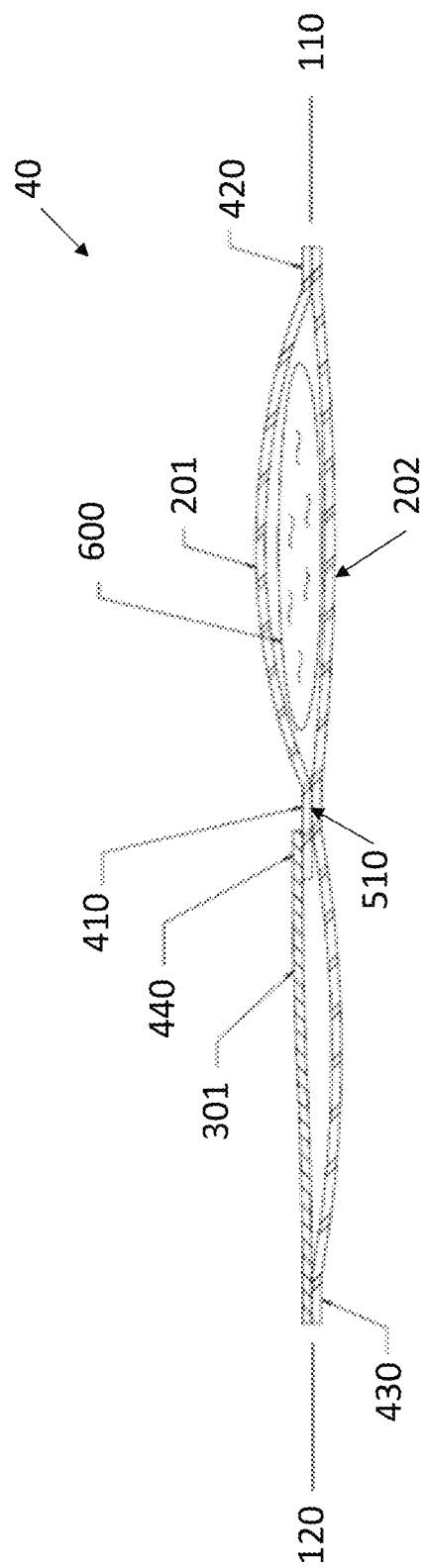
FIG. 4 depicts a cross-sectional perspective view of a device in accordance with another embodiment of the disclosed subject matter in a delivery condition.

FIG. 4 depicts a cross-sectional view of another embodiment of a fragrance delivery device (40) in accordance with another aspect of the disclosed subject matter. The device (40) includes a first flexible impermeable barrier layer (201) coupled to a second flexible impermeable barrier layer (202) to define a first chamber (110). The first chamber (110) can have a first edge (410) and a second edge (420). The first chamber (110) contains a reservoir substance (600) disposed therein having a volatile medium. The device (40) also includes a first vapor releasing microporous layer (301) having a plurality of micropores therein, and a second chamber (120) defined by the vapor releasing microporous layer (301) and the second flexible impermeable barrier layer (202). The second chamber (120) has a first edge (430) and a second edge (440). For example, and as embodied herein, the first flexible impermeable barrier layer (201) can be coupled to the second flexible impermeable barrier layer (202) at a mid-section of the second flexible impermeable barrier layer (202). The second flexible impermeable barrier layer (202) can extend beyond the coupling with the first flexible impermeable barrier layer (201) to define a portion of the second chamber (120) with the vapor releasing microporous layer (301). While the second chamber (120) in the device in FIG. 4 has been described in terms of the vapor releasing microporous layer (301) and second flexible impermeable barrier layer (202), those of skill in the art will appreciate that alternatively the first flexible impermeable barrier layer (201) could extend beyond the coupling with the second flexible impermeable barrier layer (202) such that the first flexible impermeable barrier layer (201) could alternatively define the second chamber (120) in combination with the vapor releasing microporous layer (301).

The device (40) further includes a frangible seal (510) to seal the first chamber (110) from the second chamber (120) in a delivery condition, as depicted in FIG. 4. Activation of the fragrance delivery device (40) in a use-condition compromises the frangible seal (510) to fluidly couple the first chamber (110) with the second chamber (120) and to transfer the reservoir substance (600) to the second chamber (120). The volatile medium of the reservoir substance (600) is releasable from the fragrance delivery device via the plurality of micropores in the use-condition.

The first chamber (110) of the device (40) can be adjacent to the second chamber (120). For example, the second chamber (120) can be coupled to the first chamber (110) at the frangible seal (510). As embodied herein, the frangible seal (510) can be disposed at a first edge (410) of the first chamber and a second edge (440) of the second chamber.

Figure 5:
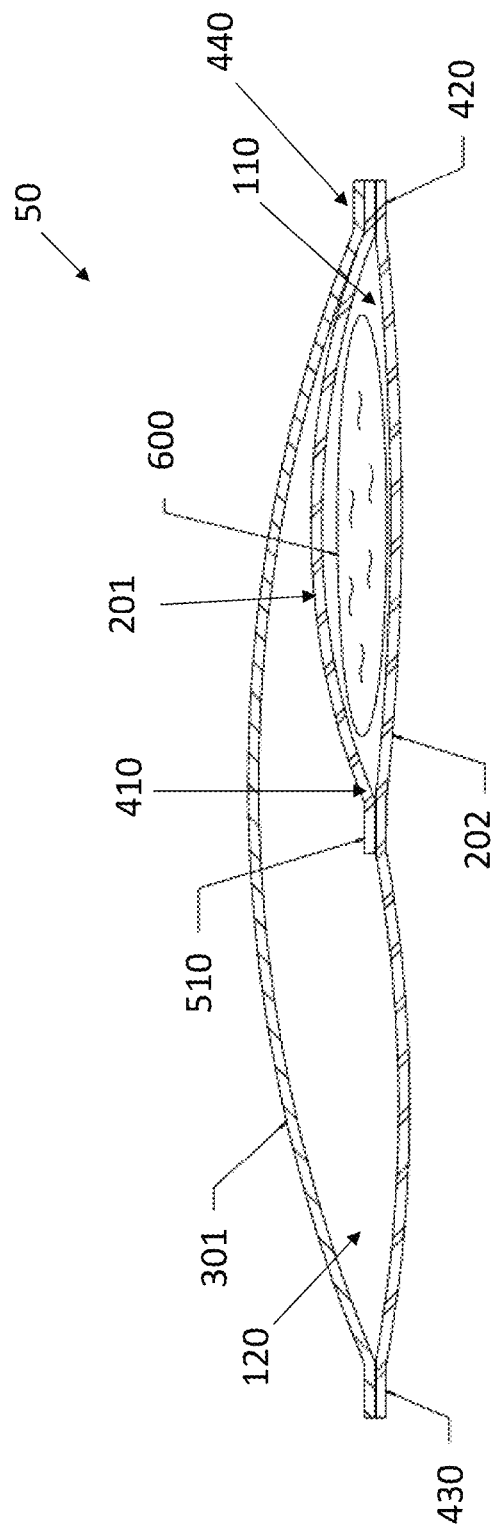
FIG. 5 depicts a cross-sectional perspective view of a device in accordance with another embodiment of the disclosed subject matter in a delivery condition.

FIG. 5 depicts a cross-sectional view of another embodiment of a fragrance delivery device (50) in accordance with another aspect of the disclosed subject matter. The device (50) includes a first flexible impermeable barrier layer (201) coupled to a second flexible impermeable barrier layer (202) to define a first chamber (110) having a first edge (410) and a second edge (420). The first chamber (110) contains a reservoir substance (600) disposed therein having a volatile medium. The device (50) also includes a vapor releasing microporous layer (301) having a plurality of micropores therein and a second chamber (120) is defined by the vapor releasing microporous layer (301) and second flexible impermeable barrier layer (202). As described further herein, the first chamber (110) can be housed within the second chamber (120). The second chamber (120) has a first edge (430) and a second edge (440). For example, and as embodied herein, the first flexible impermeable barrier layer (201) can be coupled to the second flexible impermeable barrier layer (202) at a mid-section of the second flexible impermeable barrier layer (202). The second flexible impermeable barrier layer (202) can extend beyond the coupling with the first flexible impermeable barrier layer (201) to define a portion of the second chamber (120) with the vapor releasing microporous layer (301).

As embodied herein, the coupling between the first flexible impermeable barrier layer (201) and second flexible impermeable barrier layer (202) can be a heat seal. While the second chamber (120) in the device in FIG. 5 has been described in terms of the vapor releasing microporous layer (301) and second flexible impermeable barrier layer (202), those of skill in the art will appreciate that alternatively the first flexible impermeable barrier layer (201) could extend beyond the coupling with the second flexible impermeable barrier layer (202) such that the first flexible impermeable barrier layer (201) could alternatively define the second chamber (120) in combination with the vapor releasing microporous layer (301).

The device (50) further includes a frangible seal (510) to seal the first chamber (110) from the second chamber (120) in a delivery condition, as depicted in FIG. 5. As embodied herein, the frangible seal (510) can be disposed at the first edge (410) of the first chamber (110). Activation of the fragrance delivery device (40) in a use-condition compromises the frangible seal (510) to fluidly couple the first chamber (110) with the second chamber (120) and to transfer the reservoir substance (600) to the second chamber (120). The volatile medium of the reservoir substance (600) is releasable from the fragrance delivery device via the plurality of micropores in the vapor releasing microporous layer (301) in the use-condition.

For purpose of example, and as embodied herein, the first chamber (110) of the device (50) can be housed within the second chamber (120). For example, the vapor releasing microporous layer (301) can be heat sealed to the first flexible impermeable barrier layer (201) proximate the second edge (420) of the first chamber (110). In this manner the second edge (420) of the first chamber (110) can be coextensive with the second edge (440) of the second chamber (120) and at least a portion of the second chamber (120) is disposed above and coextensive with the first chamber (110) when the device (50) is viewed in cross section.

Figure 6:
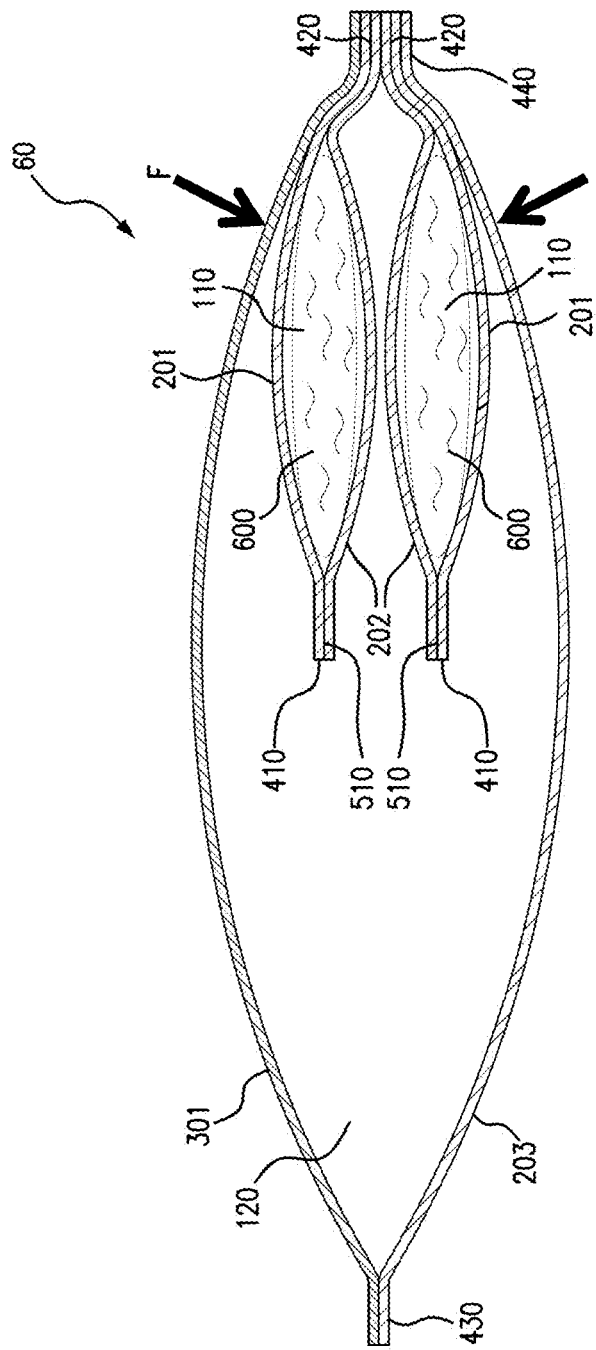
FIG. 6 depicts a cross-sectional perspective view of a device in accordance with another embodiment of the disclosed subject matter in a delivery condition.

FIG. 6 depicts a cross-sectional view of another embodiment of a fragrance delivery device, in accordance with another aspect of the disclosed subject matter. The device (60) can include a plurality of chambers, such as two or more first chambers (110). The two or more first chambers (110) each contain a reservoir substance (600) disposed therein having a volatile medium. Each of the two or more first chambers (110) includes a first flexible impermeable barrier layer (201) coupled to a second flexible impermeable barrier layer (202) to define each first chamber (110). Each first chamber can have a first edge (410) and a second edge (420).

The device (60) also includes a first vapor releasing microporous layer (301) having a plurality of micropores therein and a third flexible impermeable barrier layer (203) that define a second chamber (120). The second chamber (120) can have a first edge (430) and a second edge (440). The device (60) further includes first and second frangible seals (510) to seal each of the first chambers (110) from the second chamber (120) in a delivery condition, as depicted in FIG. 6.

In another embodiment, the first and second frangible seal (510) can comprise scoring lines or the like along a surface of the first chambers to facilitate frangible portions of the first chambers. The fragrance delivery device (60) can be activated from the delivery condition to a use-condition by imparting a predetermined force F to the device. The rupture of at least one of the frangible seals (510) fluidly couples one of the first chambers (110) with the second chamber (120) to transfer the reservoir substance (600) into the second chamber (120). A further application of predetermined force F can compromise the other frangible seal (510) to fluidly couple the other first chamber (110) with the second chamber (120) if the other frangible seal was not previously compromised. Accordingly, the predetermined force F may be such that both of the two or more first chambers (201) are activated simultaneously to compromise both of the frangible seals (510) simultaneously or the force can activate the chambers in sequence. The volatile medium of the reservoir substance (600) is releasable from the fragrance delivery device via the plurality of micropores in the use-condition.

As embodied herein, the second edges (420) of each of the first chambers (110) can be coupled with the second edge (440) of the second chamber (120) such that the two or more first chambers (110) are disposed within the second chamber (120). The interior two or more first chambers and exterior second chamber can be coupled using any suitable coupling, as described above. Alternatively, and as described with respect to the embodiment of FIG. 4, the two or more first chambers (110) of the device (60) can be adjacent to the second chamber (120).

Figure 7:
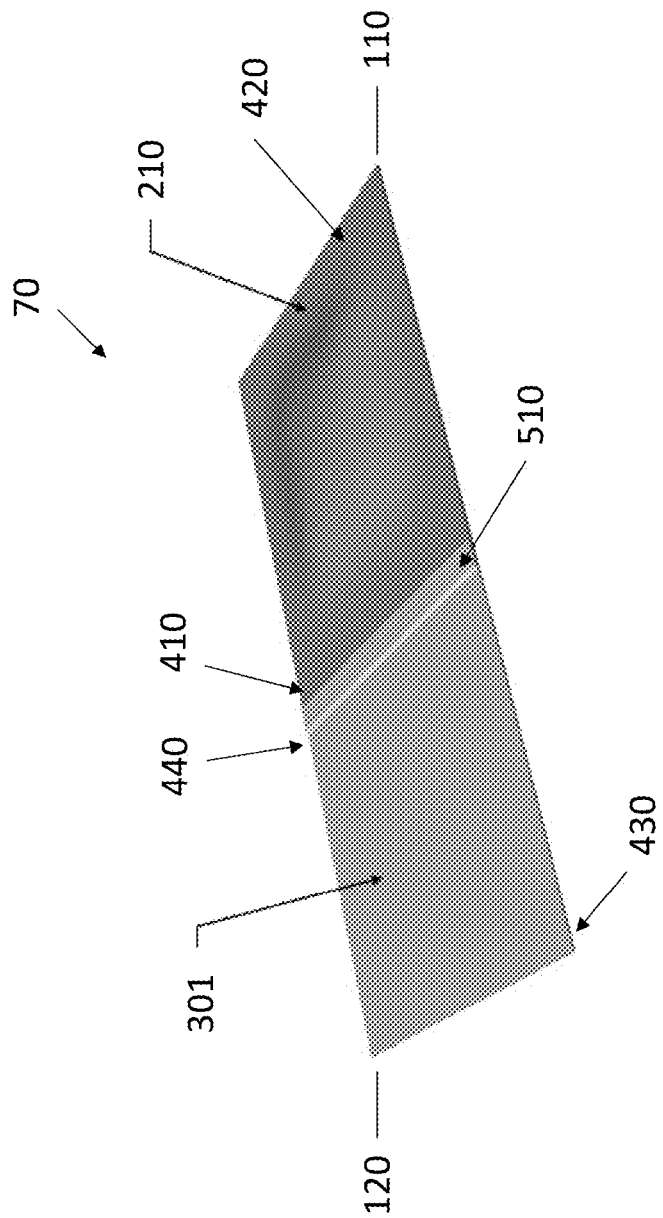
FIG. 7 depicts a perspective view of a device in accordance with FIG. 1A in a delivery condition.

FIG. 7 depicts a perspective view of another embodiment of a fragrance delivery device (70) in accordance with the disclosed subject matter. The device (70) includes a first flexible impermeable barrier layer (210) and a second flexible impermeable barrier layer coupled to the first flexible impermeable barrier layer (210) to define a first chamber (110). The first chamber (110) can have a first edge (410) and a second edge (420). A reservoir substance having a volatile medium is disposed in the first chamber (110) as evident by the contouring of FIG. 7. The device (70) further includes at least one vapor releasing microporous layer (301) defining a portion of a second chamber (120). The second chamber (120) has a first edge (430) and a second edge (440). The device (70) further includes a frangible seal (510) to seal the first chamber (110) from the second chamber (120) in a delivery condition, as depicted in FIG. 7. Activation of the fragrance delivery device (70) towards a use-condition compromises the frangible seal (510) to fluidly couple the first chamber (110) with the second chamber (120) and to transfer the reservoir substance to the second chamber (120). The volatile medium of the reservoir substance is releasable from the fragrance delivery device (70) via the plurality of micropores in the use-condition.

Figure 8:
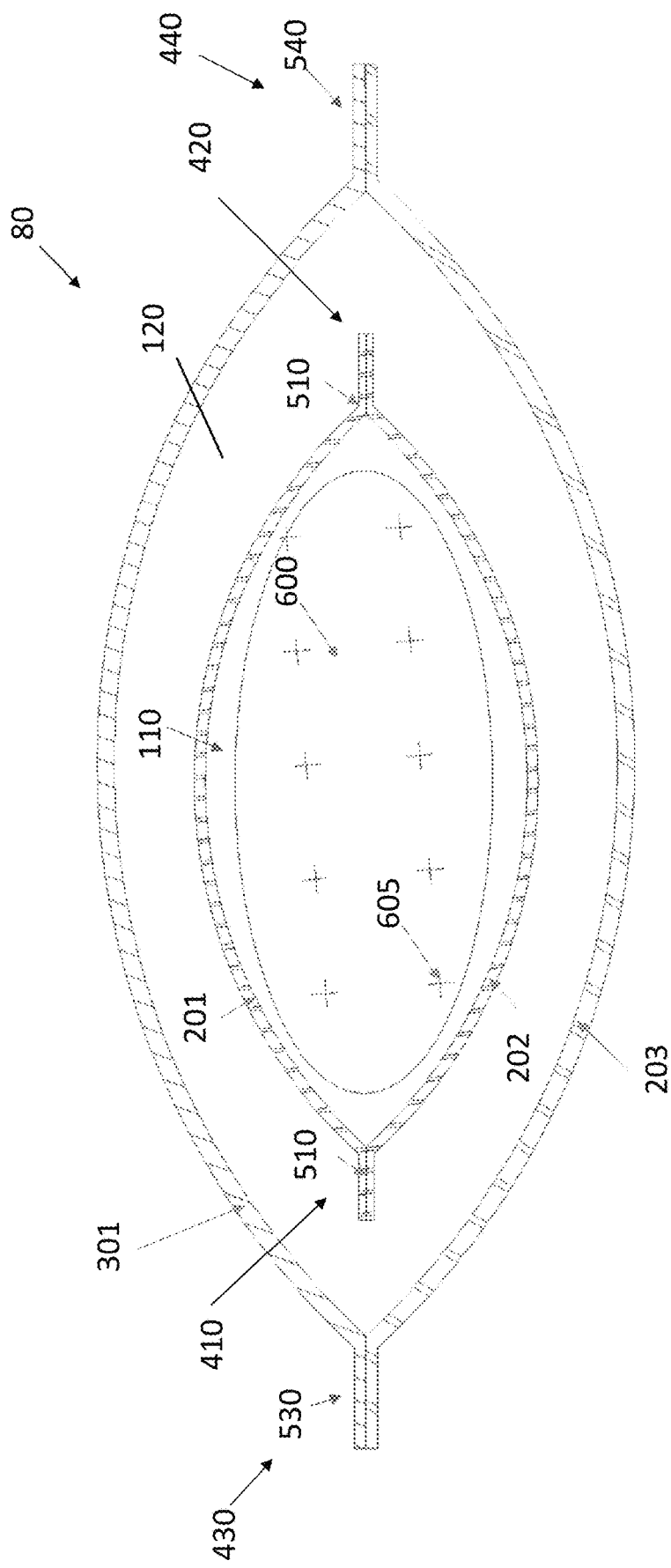
FIG. 8 depicts a cross-sectional perspective view of a device in accordance with another embodiment of the disclosed subject matter in a delivery condition.

FIG. 8 depicts a cross-sectional view of another embodiment of a fragrance delivery device (80) in accordance with the disclosed subject matter. The device (80) includes a first flexible impermeable barrier layer (201) coupled to a second flexible impermeable barrier layer (202) to define a first chamber (110). The first chamber (110) has at least a first edge. The first flexible impermeable barrier layer (201) can be coupled to the second flexible impermeable barrier layer (202) using any suitable means and as further discussed herein with respect to the other embodiments. The first chamber (110) can have a first and second edge (410/420), as depicted by the cross-sectional view of FIG. 8. The first edge (410) and the second edge (420) can be positioned along a seam defined by the first flexible impermeable barrier layer (201) and the second flexible impermeable barrier layer (202). The first chamber (110) can contain a reservoir substance (600) disposed therein having a volatile medium (605), as described further herein. The first chamber (110) can define a predetermined volume, and the reservoir substance (600) can have a volume equal or less than the predetermined volume of the first chamber (110).

The device (80) also includes a first vapor releasing microporous layer (301) having a plurality of micropores therein and flexible impermeable layer (203) coupled hereto. In an alternative embodiment, the first and second layers can be made of the same material as further discussed herein. Accordingly, the device can include a first and second vapor releasing microporous layer instead of a first vapor releasing microporous layer and a flexible impermeable layer. For purposes of example and with reference to FIG. 8, the first vapor releasing microporous layer (301) and the flexible impermeable layer (203) define a second chamber (120). The second chamber (120) has at least one edge (430/440), such as along a seam interfacing (530/540) between the layers (301/203). For purpose of example, and as embodied herein, the first chamber (110) can be disposed within the second chamber without any mechanical connection with the second chamber such that the first chamber can float within the second chamber, as shown in FIG. 8. Accordingly, the first chamber is disposed within the second chamber in both the delivery and use-condition.

The device (80) further includes a frangible seal (510) to seal the edge of first chamber (110) in a delivery condition. The flexible impermeable barrier layers (201) and (202) can inhibit the volatile medium from emitting through the plurality of micropores of the second chamber (120) when the device is in the delivery condition. The frangible seal (510) can be any suitable frangible seal as known in the art. For purpose of example, and as embodied herein, the frangible seal (510) can be a region of the heat seal coupling the first (201) and second (202) flexible impermeable barrier layers together that is configured to be compromised or ruptured when subjected to a predetermined pressure. For example, the frangible seal can be compromised or ruptured when a person squeezes the first chamber between his or her fingers with sufficient force. Additionally or alternatively, at least one of the first (201) and second (202) flexible impermeable barrier layers can include score lines in a region of the coupling between the two layers, and the score lines can define at least a portion of the frangible seal (510). For example, at least one of the first (201) and second (202) flexible impermeable barrier layers can be configured to separate or tear at the score lines when subjected to a predetermined pressure.

As described above, when the device is in the delivery condition, the frangible seal inhibits the volatile medium from exiting the first chamber into the second chamber, and thus the flexible impermeable barrier layers can inhibit the volatile medium from emitting through the plurality of micropores of the vapor releasing microporous layers. The frangible seal can be compromised, or ruptured, thereby converting the device from the delivery condition to the use condition, when a force of a predetermined amount is exerted on the first chamber. For example, the frangible seal can be compromised or ruptured when a person squeezes the first chamber between his or her fingers with sufficient force.

As embodied herein, the devices described herein can be fully-sealed and self-contained without the need for supplemental outer housing packaging or supplemental devices to rupture the chamber. Furthermore, the fragrance delivery devices can be used without the need of a warming or energizing unit. The device can be oriented in any configuration or adhered to surfaces and is not limited to a horizontal orientation is as often required by conventional devices.

The volatile medium found in the reservoir substance of the fragrance delivery device may be a fragrance causing the local area to take on a pleasant aroma. In other embodiments, however, the volatile medium may be a medicant, decongestant, insect repellant, insecticide, aroma therapeutic composition, or any other vapor having therapeutic or beneficial qualities, or which causes some desired effect. In some embodiments, the reservoir substance includes at least one of a gel, oil, wax, or combination thereof. The contents and composition of the reservoir substance is described further herein.

In accordance with another aspect of the disclosed subject matter, a fragrance delivery system is provided. The fragrance delivery system includes providing a fragrance delivery device in accordance with the disclosed subject matter, such as described with respect to the embodiments depicted in FIGS. 1A-8. The system further includes activating the fragrance delivery device from the delivery condition to the in-use condition, wherein the activating includes exerting a predetermined pressure to the fragrance delivery device to compromise the frangible seal to fluidly couple the first chamber with the second chamber and to transfer the reservoir substance to the second chamber. The system further includes releasing the volatile medium of the reservoir substance from the fragrance delivery device via the plurality of micropores.

The Barrier Layer

In the embodiments shown in FIGS. 1A-8, the device includes a barrier layer constructed using a flexible, impermeable barrier laminate. In an embodiment of the disclosed subject matter, the barrier laminate comprises a foil layer in a multi-layer construction, which provides an impervious barrier as well as a heat sealable layer of polyethylene or polypropylene.

The barrier layer can include any suitable material such as the barrier panel materials as disclosed in U.S. Publication No. 2014/0048614, incorporated herein by reference in its entirety. The external surface of the barrier layer can further include an adhesive to permit the device to stick to a locker door, vehicle dashboard, or the like.

In other embodiments, the barrier layer is formed of a semi-rigid or rigid material, for example but not limitation, polyethylene terephthalate or polyolefin coated aluminum, and is joined to the vapor releasing microporous layer as known in the art, such as, but not limited to, through the use of a mechanical union or through the means of a sonic or heat sealed weld, forming a fluid tight perimeter seal.

The Vapor Releasing Microporous Layer

As embodied herein, the device includes at least one vapor releasing microporous layer. In certain embodiments, the vapor releasing microporous layer is coupled to another vapor releasing microporous layer. In other embodiments the vapor releasing microporous layer is coupled to a lower barrier layer along the perimeter of the device. In certain embodiments, the two layers are sonically or heat sealed. However, other means of sealing are contemplated herein.

The vapor releasing microporous layer comprises a microporous material having micropores, thereby allowing for the rate of fragrance release into the environment to be controlled via the overall thickness, permeability, porosity, and average pore size of the material. The use of a microporous material enables the presently disclosed device to offer performance advantages, such as a more linear and predetermined rate of release and a prolonged functional life, as compared to currently available wax melts, which result in fully exposed pools of hot molten wax upon being heated. The rate of release of the volatile medium, i.e., fragrance, through the vapor releasing microporous layer could be adjusted based on the thickness, permeability, porosity, and average pore size of the microporous materials used. In certain embodiments of the presently disclosed device, the porosity is between about 35% to about 65%, between about 35% to about 60%, between about 35% to 55%, or between about 40% to 55%. In other embodiments of the presently disclosed device, the average pore size is between about 0.01 to 0.07 microns, between about 0.02 to 0.07 microns, or between about 0.03 to 0.07 microns. In further embodiments of the presently disclosed device, the vapor releasing microporous layer has a Gurley permeability rating of about 200 seconds to about 800 seconds. For purpose of example and not limitation, the vapor releasing microporous layer can have a water vapor transmission rate (WVTR) of between approximately 6,000 $g/m^2/day$ and approximately 9,000 $g/m^2/day$ and a weight between approximately 12.8 $g/m^2$ and approximately 19.2 $g/m^2$. As embodied herein, the vapor releasing microporous layer can have a water vapor transmission rate of approximately 7,500 $g/m^2/day$ and a weight of approximately 16 $g/m^2$.

In some traditional fragrance releasing devices, bleeding, sweating, seepage, or leakages of the fragrance solution through membrane coverings in traditional fragrance releasing devices may occur. Typically, evidence of drops and/or a film of liquid may be visually observed on the surface by the naked eye over time. In certain embodiments the microporous membrane material is oleophobic which functions to prevent bleeding, sweating, seepage, or leakages of the volatile medium out of the chamber. The oil repellency of the oleophobic membrane material may be graded using the AATCC Standard Test Method No. 118, which is based on the resistance of a material to penetration of certain oils or mixtures of oils of varying surface tensions using a scale from 1 (i.e., resistant only to the least penetrating of the test oils) to 8 (i.e., resistant to the most penetrating of the test oils) using the test oils shown in the following table:

| Grade | Test Oil |
|---|---|
| 1 | Kaydol |
| 2 | 65/35 Kaydol/n-hexadecane by volume |
| 3 | n-hexadecane |
| 4 | n-tetradecane |
| 5 | n-dodecane |
| 6 | n-decane |
| 7 | n-octane |
| 8 | n-heptane |

A grade of 0 is assigned to materials which are not resistant to the least penetrating of the test oils and not considered oleophobic according to the present disclosure. Higher numbers indicate better oil repellency. In certain embodiments of the presently disclosed device, the microporous material has an oil repellency grade equal to or greater than 3. In some embodiments of the presently disclosed device, the microporous material has an oil repellency grade between 3 and 7. In other embodiments of the presently disclosed device, the microporous material has an oil repellency grade between 4 and 6. For purpose of example, and as embodied herein, the microporous membrane material can have an oil repellency grade of 6.

The microporous membrane material may be inherently oleophobic or may be rendered oleophobic by treating the material with an oil resistant coating to achieve the desired oil repellency grade. Thus, in one embodiment, the presently disclosed device comprises a microporous membrane having an oleophobic coating. In one particularly suitable embodiment, a fluorocarbon-based coating is applied to the microporous membrane material according to the methods described in U.S. Pat. Nos. 6,270,841 and 7,005,161, incorporated by reference herein, wherein the monomer is selected based on the membrane material to be treated and for oleophobic characteristics. The microporous membrane may be coated on one or both sides of the membrane. For membrane materials treated with an oil resistant coating, the coating used can be a coating which does not substantially change the permeability and/or porosity of the treated membrane compared to the permeability and/or porosity of the untreated membrane. The level of oleophobicity can depend on the thickness of fluorocarbons deposited on the microporous membrane material. For example, the thickness of deposited fluorocarbons can be between approximately 0.1 and approximately 0.4 microns.

In one embodiment of the disclosed subject matter, the rate controlling vapor permeable oleophobic membrane is one of the microporous membranes sold commercially as CELGARD® (Celgard LLC, Charlotte, North Carolina) and treated with a fluorocarbon based coating as described above. The CELGARD® membrane family is manufactured in a variety of offerings as the permeability, porosity, average pore size, and thickness of the membranes offered vary. Particularly suited to the disclosed subject matter is CELGARD® 4560, which is a composite structure comprising CELGARD® 2500 that is laminated to a loosely structured non-woven polypropylene article. CELGARD® 2500 is a hydrophobic polypropylene in which sub-micron pores are formed in the polypropylene film during processing. CELGARD® 4560 has a base film thickness of 25 µm while the laminated film thickness is approximately 110 µm. The machine direction tensile strength of CELGARD® 4560 is 1055 Kg/cm$^2$ and the cross direction tensile strength is 135 KG/cm$^2$. Other membranes are further suitable with this device as contemplated herein, such as those under the trademark SOF-FLEX® (Berry Global Inc, Mason, Ohio).

In a construction of the presently disclosed device wherein the microporous membrane comprises an oleophobic coating on only one side of the membrane, the coating may be situated either on the side of the membrane on the inner side of the cavity in contact with the reservoir substance or on the outer side of the membrane. For purpose of example and not limitation, the oleophobic coating can be applied to the outer side of the membrane. In such configurations, the inner surface of the microporous membrane can be heat sealed to either another membrane layer or a flexible impermeable barrier layer and the oleophobic coating will not interfere with the heat seal process. In an embodiment of the presently disclosed device, a coated CELGARD® 4560 is orientated with the oleophobic coating on the outer side of the membrane and the non-coated, non-woven side of the membrane on the inner side of the chamber in contact with the reservoir substance/composition. For membrane materials treated with an oil resistant coating, the permeability of the treated membrane should be the same or substantially similar to the permeability of the untreated membrane.

In one embodiment, the presently disclosed device comprises a vaper releasing oleophobic microporous layer having a porosity between about 40% and 60%, an average pore size between 0.03 and 0.07 microns, and an oil repellency grade of 4, 5 or 6.

The microporous membrane according to the disclosed subject matter can function as a containment device for the reservoir substance disclosed herein and does not function as a wicking device, as traditional porous membranes commonly function. The microporous material enables a greater range of olfactive categories for use with the device, in contrast to traditional monolithic membranes. International Publication No. WO2018/208866 describes microporous membranes such as those in accordance with the disclosed subject matter and the benefits of such microporous membranes as compared to traditional membranes. The disclosure of WO2018/208866 is hereby incorporated by reference in its entirety.

It is possible that by selecting a membrane with a different permeability and/or porosity and/or average pore size and/or thickness and/or oil repellency grade that the opportunity exists for using the membrane as a rate controlling mechanism in exerting influence over the rate of release of the active agents while preventing leakage, seepage, or bleeding of the volatile medium out of the reservoir. This form of control can be important if the currently disclosed device is used for the dispersion of insecticides and medicants or medicaments.

Another unique aspect which pertains to the use of a microporous rate controlling membrane is the ability to print on the membrane with text, designs, logos and the like and have the colors and designs remain stable when in contact with the contents of the reservoir substance. The ability to print the fragrance name or a picture of a scene on the device in support of fragrance positioning is a valuable visual contribution offered by present device and can assist in pairing certain colors with select fragrances, such as the color yellow for citrus fragrant devices. Although the printing can block the microporous openings in the membrane depending on the material used for printing, a lightly designed pattern or design will not cause any significant reduction in the ability of the device to release its active agents.

In certain embodiments, a polyolefin based material is utilized for its heat sealing capabilities, thereby allowing for an easily sealed perimeter during manufacture of the device of the disclosed subject matter. Non-limiting examples of microporous and porous polyolefin based materials suitable for use in the present device once treated with an oleophobic coating include those under the tradename Teslin® (PPG Industries, Pittsburgh, PA) and Tyvek® (E.I. du Pont de Nemours and Company, Wilmington, DE), among other suitable manufacturers. Teslin® membranes, in particular, are compatible with a broad range of print processing and can be utilized in embodiments of the present device intended to have a printed design. Other suitable membranes include those as commercially sold by Berry and Bluetek.

The Reservoir Substance

The reservoir or chamber of the device can be filled with a reservoir substance comprising a volatile medium (i.e., fragrance or fragrance composition). The chamber includes a predetermined volume. The volatile composition can be selected from a variety of options to include fragrances, aroma therapeutic compositions, medicants, medicaments, decongestants, insect repellants, insecticides and the like. In some embodiments the volatile medium can be dispersed in a matrix medium.

The Volatile Medium

As disclosed herein, volatile mediums can include different fragrances or fragrance compositions. In certain embodiments, the fragrances can include, but are not limited to, floral fragrances, musky fragrances, wood fragrances, gourmand fragrances, and combinations thereof. The fragrance types are formulated as a single chemical compound or as fragrance compositions comprising one or more chemical compounds. Additionally, such fragrances or fragrance compositions can be used at higher levels than was is used in a traditional membrane.

In a particular embodiment, the fragrance can be a floral fragrance, such as lily of the valley. Non-limiting examples of floral fragrance include a-methyl-4-(1,1-dimethylethyl) benzenepropanal (such as Lilial®), 4-(4-Hydroxy-4-methylpentyl)-1-cyclohex-3-enecarboxaldehyde (such as Kovanol®), 4-methyl-2-(2-methylpropyl)oxan-4-ol (such as Florol®, floral pyranol,), 3-(1,3-benzodioxol-5-yl)-2-methylpropanal (such as Heliobouquet®, ocean propanal), and combinations thereof.

In another embodiment, the fragrance can be a musky fragrance. In a particular embodiment, the musky fragrance can be 4,6,6,7,8,8-Hexamethyl-1,3,4,6,7,8-hexahydrocyclopenta[g]isochromene (such as Galaxolide®), ethylene brassilate (such as Musk T®), and combinations thereof. Musky fragrance mediums can be used in amounts of from about 1% to about 2% up to from about 20% to about 30%, based on the total amount of the reservoir substance.

In another embodiment, the fragrance can be a woody fragrance. In a particular embodiment, the woody fragrance can be 1-(1,2,3,4,5,6,7,8-Octahydro-2,3,8,8-tetramethyl-2-naphthalenyl)-ethan-1-one (such as Iso E Super®), 4-tert-butylcyclohexyl acetate (such as Vertenex®), and combinations thereof. Woody fragrance mediums can be used in amounts of up to about 40%, based on the total amount of the reservoir substance.

The Matrix Medium

In addition to the volatile mediums, in certain embodiments, the reservoir substance may also contain a matrix medium for delivering fragrance to an external environment via the microporous membrane, such as disclosed in International Publication Number WO2017/070344, the contents of which are hereby incorporated in their entirety.

The chamber of the present device is accepting of a wide variety of reservoir substance forms, including solids, semi-solids, viscous liquids, non-thickened fragrance oil. Non-limiting examples of reservoir substance options include, but are not limited to paraffin waxes, soy waxes, wax blends, wax and oil blends, metallic soap based gels, elastomeric gels, gels formed using modified clays, e.g., bentonite gels or colloidal silica gels. In a particular embodiment, the reservoir substance is not a water-based solution, rather it is a gel-based, thereby allowing the reservoir substance to contain a high percentage of fragrance and produce a fragrance of high intensity. The final consistency of the reservoir composition is highly impacted by the amount of volatile mediums dispersed within the matrix of the reservoir substance, and the rheological format of the reservoir substance should be such that at the consistency is suitable for operation at ambient temperatures.

In specific embodiments, the matrix medium is a gel medium. Importantly, the gel medium is not a liquid. The gel medium contains the volatile medium therein to further prevent any bleeding, sweating, leaking or spilling of the volatile medium. Such embodiments of the presently disclosed device are particularly suitable for uses wherein the orientation of the device may change or spilling of the volatile medium is undesirable, such as use of the device to provide fragrance in a gym bag.

In certain embodiments, the viscosity of the reservoir substance includes a viscosity dimension, which can range from about 500 cps to about 8500 cps at ambient temperature. The reservoir substance accordingly does not include fillers that traditional systems typically require. However, the reservoir substance can comprise a high heat resistant olefin combined with an elastomeric polymer thickener and volatile mediums to ensure controlled fragrance release within the viscosity range to keep the reservoir substance intact under the microporous membrane to avoid spills, leakage, or the like. Traditional devices that utilize gel substances without a membrane require the gel substance to consist of a rubberized solid outside the viscosity ranges disclosed herein. Such mediums hinder diffusion of suitable mediums according to the disclosed subject matter.

Conventional wax melts and wax tarts must be sufficiently solid in order to retain their shape. For this reason, conventional fragrance loadings are kept low, with a range of about 6% to about 12%, by weight, being common, and with an inability to exceed 12% maximum by weight. As the fragrance medium of the present device is not limited to a solid shaped composition, fragrance loadings as high as about 100% by weight can be achieved. In particular fragrance loadings of between about 30%-100% by weight, between about 30%-99% by weight, between about 30%-90% by weight, between about 40%-80% by weight, between about 45%-75% by weight can be achieved. The reservoir substance rheology along with the fragrance loading must be balanced in such a way that the fluid nature of the reservoir substance composition at ambient temperatures does not permeate the micropores of the vapor releasing microporous layer and result in a fluid accumulation on the outside of the device.

While the disclosed subject matter is described herein in terms of certain embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods, devices, and systems of the disclosed subject matter without departing from the spirit or scope of the disclosed subject matter. Thus, it is intended that the disclosed subject matter include modifications and variations that are within the scope of the appended claims and their equivalents.

What is claimed is:

1. A fragrance delivery device, comprising:
    a first flexible impermeable barrier layer;
    a second flexible impermeable barrier layer coupled to the first flexible impermeable barrier layer, the first and second impermeable barrier layers defining a first chamber;
    a reservoir substance disposed in the first chamber and having a volatile medium;
    a first vapor releasing microporous layer having a plurality of micropores therein;
    a second vapor releasing microporous layer having a plurality of micropores therein, wherein the first and second vapor releasing microporous layers define a second chamber; and
    a frangible seal to seal the first chamber from the second chamber in a delivery condition, wherein the frangible seal is defined by a first edge of the first flexible impermeable barrier layer and a first edge of the second flexible impermeable barrier layer, wherein at least one of a first edge of the first vapor releasing microporous layer and a first edge of the second vapor releasing microporous layer is coupled to the first edge of the first flexible impermeable barrier layer or the first edge of the second flexible impermeable barrier layer, wherein activation of the fragrance delivery device in a use-condition compromises the frangible seal to fluidly couple the first chamber with the second chamber and to transfer the reservoir substance to the second chamber, wherein the volatile medium of the reservoir substance is releasable from the fragrance delivery device via the plurality of micropores in the use-condition.

2. The fragrance delivery device of claim 1, wherein the flexible impermeable barrier layers inhibit the volatile medium from emitting through the plurality of micropores when the device is in the delivery condition.

3. The fragrance delivery device of claim 1, wherein a force of a predetermined amount exerted on the first chamber transfers the fragrance delivery device from the delivery condition to the use-condition.

4. The fragrance delivery device of claim 1, wherein an edge of the first chamber is coupled with an edge of the second chamber.

5. The fragrance delivery device of claim 1, wherein the device is a self-contained unit.

6. The fragrance delivery device of claim 1, wherein the first chamber defines a predetermined volume, wherein the reservoir substance has a volume equal to or less than the predetermined volume.

7. The fragrance delivery device of claim 1, wherein the volatile medium includes at least one of a medicant, decongestant, insect repellent, insecticide, fragrance, and an aroma therapeutic composition.

8. The fragrance delivery device of claim 1, wherein the reservoir substance includes at least one of a gel, oil, wax, or combination thereof.

9. The fragrance delivery device of claim 1, wherein the first edge of the first vapor releasing microporous layer overlaps with and is heat sealed to the first edge of the first flexible impermeable barrier layer at the frangible seal.

10. The fragrance delivery device of claim 1, wherein the first edge of the second vapor releasing microporous layer overlaps with and is heat sealed to the first edge of the second flexible impermeable barrier layer at the frangible seal.

11. A method of using a fragrance delivery device, comprising:
    providing a fragrance delivery device having:
        a first flexible impermeable barrier layer,
        a second flexible impermeable barrier layer coupled to the first flexible impermeable barrier layer, the first and second impermeable barrier layers defining a first chamber,
        a reservoir substance disposed in the first chamber and having a volatile medium,
        at least one first vapor releasing microporous layer having a plurality of micropores therein,
        a second vapor releasing microporous layer having a plurality of micropores therein,
        wherein the at least one first vapor releasing microporous layer and the second vapor releasing microporous layer define a second chamber, and
        a frangible seal to seal the first chamber from the second chamber in a delivery condition, wherein the frangible seal is defined by a first edge of the first flexible impermeable barrier layer and a first edge of the second flexible impermeable barrier layer, wherein at least one of a first edge of the first vapor releasing microporous layer and a first edge of the second vapor releasing microporous layer is coupled to the first edge of the first flexible impermeable barrier layer or the first edge of the second flexible impermeable barrier layer; and
    activating the fragrance delivery device from the delivery condition to a use-condition, wherein the activating includes exerting a predetermined pressure to the fragrance delivery device to compromise the frangible seal and fluidly couple the first chamber with the second chamber and transfer the reservoir substance to the second chamber; and releasing the volatile medium of the reservoir substance from the fragrance delivery device via the plurality of micropores.

12. The method of claim 11, wherein a force of a predetermined amount exerted on the first chamber transfers the fragrance delivery device from the delivery condition to the use-condition.

13. The method of claim 11, wherein the first chamber is adjacent to the second chamber and coupled together at the frangible seal.

14. The method of claim 11, wherein the flexible impermeable barrier layers inhibit the volatile medium from emitting through the plurality of micropores when the device is in the delivery condition.

15. The method of claim 11, wherein the device is a self-contained unit.

16. The method of claim 11, wherein the first chamber defines a predetermined volume, wherein the reservoir substance has a volume equal to or less than the predetermined volume.

17. The method of claim 11, wherein the volatile medium includes at least one of a medicant, decongestant, insect repellant, insecticide, fragrance, and an aroma therapeutic composition.

18. The method of claim 11, wherein the reservoir substance includes at least one of a gel, oil, wax, or combination thereof.

19. The method of claim 11, wherein the first edge of the first vapor releasing microporous layer overlaps with and is heat sealed to the first edge of the first flexible impermeable barrier layer at the frangible seal.

20. The method of claim 11, wherein the first edge of the second vapor releasing microporous layer overlaps with and is heat sealed to the first edge of the second flexible impermeable barrier layer at the frangible seal.

* * * * *